Figure 1:
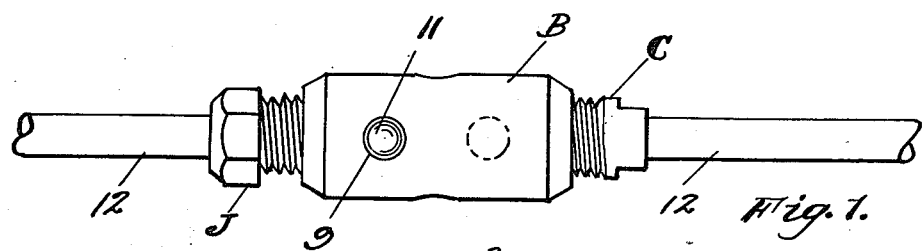

March 8, 1938. H. R. CRANE 2,110,202

ROD COUPLING

Filed Jan. 26, 1937

INVENTOR,
H. R. Crane;
By
F. E. Maynard

Patented Mar. 8, 1938

2,110,202

UNITED STATES PATENT OFFICE 2,110,202

ROD COUPLING

Hubert R. Crane, Los Angeles, Calif.

Application January 26, 1937, Serial No. 122,406

3 Claims. (Cl. 287—20.5)

This invention is a rod connecting device of the type shown in U. S. Patent No. 368,764, of 1887, to Hammer, in Figs. 7 and 8 disclosing a sleeve having opposite, offset, lateral apertures and rods having laterally extending portions to be inserted in the sleeve and surrounded by the walls of the apertures, and showing screw threaded retaining means to center the rods.

The art of Hammer was advanced by Allen, U. S. Patent No. 1,459,869, of June 26, 1923, showing a one-piece sleeve having lateral apertures for hook portions of rods and showing retainer means at the sleeve, embracing and centralizing the rod and holding the rod end portions in the apertures.

U. S. Patent No. 1,901,108, Mar. 14, 1933, to Kalben, shows a rod coupling with a solid body having exterior channels for hook-end rods, as in Hammer, but providing no interlock in the body itself, but facilitating assembly of parts over the prior art.

It is the object of the present invention to provide a solid or non-tubular form of coupling body which eliminates the outside channels of Kalben and provides a fixed, internal means in the body to center the inserted hook-shank or rod prior, even, to the screwing up of the usual rod collar, as of Kalben, or the jam nut or bushing of Peck, U. S. Patent No. 1,501,465, July 15, 1924; either which form of retainers may be employed in the present invention. In other words, an object of the invention is to provide an abutment substantially on the axis of the rod-taking bore of the coupler body and in such arrangement as to the bore and a lateral hook receiving aperture in the body that there is a means presenting a ledge, shoulder or stop face to uphold the hook of the rod in the aperture with the inner end of the shank substantially in axial alinement before, and facilitating, screwing up of the rod collar onto the body.

And, further, an object is to provide means acting on the rod to jam it without chance of lost motion onto the said shoulder device.

The present invention is distinguished from the copending application, of the instant inventor, filed Jan. 9, 1937, S. N. 119,818, in that that invention is founded on a different and chuck action principle where the rod and the nut or collar bind one on the other, whilst in the present case the jam collar is a bushing which coacts with the said body bench to clinch the rod against play, though the rod has a reliable interlock in the body which may be depended on up to a very considerable tilt of the rod as to the axis of the body even though the jam bushing should possibly work out of the body; this being a feature distinguishing the coupling entirely from the open channels of Kalben.

The invention aims, additionally, to provide both an interior body shoulder to center the hook end in a bore of materially larger diameter than the rod, and a jam collar or bushing which serves to steady and center the inserted shank end as the clamping collar is initially moved up and screwed onto the body after the hook has been abutted against the shoulder in the bore of the body.

In furtherance of assembling facility of couplers of this class, an object is to provide a device which reacts on the rod hook to acutely and positively thrust it radially into interlocking engagement with the complementary hook aperture of the coupler body.

In view of the great tension to which rods of this type are subjected in cleaning a sewer or pipe line, for instance, it is desirable that the strain be entirely removed from the lateral tip of the hook which may, under great strain, snap off or straighten out (due to hook leverage) and that the strain be applied at a point of the rod bend close to the rod shank where the breaking leverage is so short that it could not reasonably break or straighten the hook, the function of which latter is to provide a reliable, rotative hitch between the body and its rods. To that objective the collar is here in the form of a body bushing designed to positively engage the fillet of the hook close to the rod shank and act, first to jam the convex arch of the hook onto the bench and, then, when tension is set up in the rod string, the inner end of the bushing is the buttress taking the pull at the hook fillet and removing it from the lateral tip of the hook; which is itself gripped between the bench and the bushing without play.

The invention also includes a novel method of making the coupler body.

The invention consists of certain advancements in the rod coupling art as set forth in the ensuing disclosure and having, with the above, additional objects and advantages as hereinafter developed, and whose construction, combination and details of means, and method of manufacture, and manner of operation will be made manifest in the description of the annexed, illustrative apparatus or embodiment; it being understood that modifications, variations and adaptations may be resorted to within the scope, principle and spirit of the invention as it is more directly claimed in the appendage.

Figure 2:
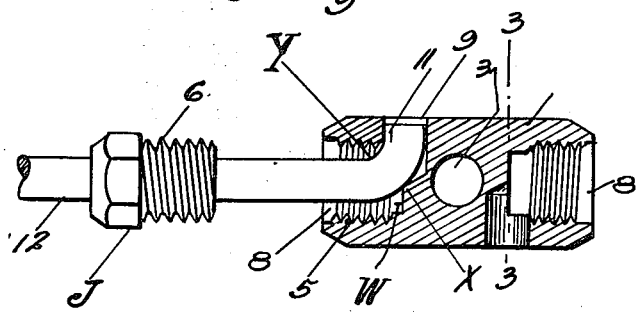
Figure 3:
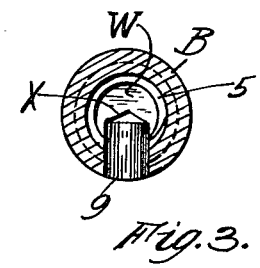
Figure 5:
Figure 4:
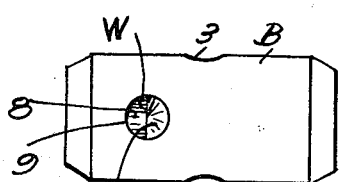

Figure 1 is a longitudinal elevation of the assembled coupler parts and rods. Figure 2 is an axial section of the coupler body showing a shoulder supported rod hook therein prior to the setting up of its slidable, screw bushing. Figure 3 is a cross-section of the body on line 3—3 of Fig. 2. Figure 4 is a plan of the body to show the lateral aperture and its bottom shoulder. Figure 5 is a screw-end view of the clamp bushing.

A feature of the present invention is the provision of a cylindrical body B having in one or each of its ends a bore 8 which is considerably larger in diameter than the diameter of the relative rod 12 whose quarter-turn hook end is interhooked in a lateral aperture 9 through the body wall from each bore 8. With such a larger bore the inserted rod end may have considerable parallel shift from an axial position while the rod hook lies in the radial, complementary aperture 9. Such shift is very undesirable because of the capacity of the hook of centrically dropping from the aperture by such lateral shift, and, also, because in assembling the rod end in the bore and aperture the large tolerance makes it tedious to keep the hook tip in the aperture and at the same time shift the threaded, slidable jam bushing J up to and aline it for screwing into the threads 5 of the bore 8.

Therefore, the present invention has to do with a device which enables the actual interlock of the hook 11 in the lateral aperture 9 of the body B, as distinguished from the open channel 2ᶜ—2ᵈ of Kalben in the body of which the hook has no interlock, and which device further affords an axial shoulder on which the hook 11 may positively seat at X, Fig. 1, to sustain the hook end in axial position to greatly facilitate the interengagement of the threads 6 of the bushing J with the bore threads 5. The body B is end-bored to produce the transverse or diametrical wall W and to intersect with a radial line forming the axis of a taper-point drill run in either before or after end-boring so as to produce the lateral aperture 9; the drill point being stopped at a position which will produce the shoulder X substantially at the axis of the bore 8.

Thus when the quarter-turn hook 11 is wormed into position, Fig. 1, its convex arch will abut the shoulder X while the hook tip is held in the complementary-size aperture 9 and the hook is held against noticeable play axially in the body and is jacked against straight, inward radial release motion by the supporting shoulder X. This is an important structural detail in these knockdown couplings because facilitating hook and body interlock and sustaining it before the jam bushing J is set up. With the hook 11 centered, interlocked and sustained by the shoulder X it is then easy to slide up and register the jam bushing for screwing of its threads 6 into the relative bore threads 5.

It will be seen that as the inner end of the bushing is run into the bore said end will engage the near, concave arch of the hook at Y close to the shank of the rod and then jam the opposite convex side of the hook up against the shoulder X which re-acts on the inclined hook face in a manner to positively thrust the hook end outwardly into the aperture 9 due to the pressure of the clamping element or bushing J. At the same time the re-action tends to lock or bind the bushing against accidental unscrewing from the bore.

The body B is adapted in one way or another for the application of a torque exerting tool; as a stiff bar inserted in a through hole 3.

The bore 8 and the distance of the aperture 9 from the outer end of the body are such that the hooked end of the rod may be worked into interlock without noticeable difficulty. In setting up a coupler assembly, one rod end may be jammed in place by a fine-thread collar C for a more or less permanent joint; the assembly being disconnected, in practical working service, only at the jam bushings J along a string of rods in sewer cleaning apparatus.

The clinch of the inserted rod ends between the inner end of the bushings J and collars C and the opposing shoulder parts X in the bodies removes the pulling tension and the pushing strain from the tips of the several hooks 11, and at the same time lost motion of the tips of the hooks in the lateral apertures is prevented.

What is claimed is:

1. A rod coupling having a body provided with an end bore of materially larger diameter than the relative rod and a lateral aperture from the inner end thereof; the bottom of the aperture forming a ledge in the end wall of the bore to abut the bend of an inserted rod hook and prevent straight inward radial shift of the rod hook from the aperture.

2. A coupler as set forth in claim 1, and means screwing onto the body and being engageable with the concave arch of the hook and operative to jam the hook against the said ledge.

3. A rod coupling having a body provided with a lateral rod-hook receiving aperture with its bottom at about the axis of the body, and the body having an end bore whose inner end wall forms a rod stop and intersects the lateral aperture at about the axis of the latter and forms a passage complementary to the said hook so that it may be worked into the aperture through said bore.

HUBERT R. CRANE.